United States Patent
Brown et al.

(10) Patent No.: US 10,662,872 B2
(45) Date of Patent: May 26, 2020

(54) MODULAR SUPERCHARGER TOP PLATE SYSTEM

(71) Applicants: Susan JoAnn Brown, Spencer, TN (US); David George Brown, Spencer, TN (US)

(72) Inventors: Susan JoAnn Brown, Spencer, TN (US); David George Brown, Spencer, TN (US)

(73) Assignee: NitroSew LLC, Rehoboth Beach, DE (US)

(*) Notice: Subject to any disclaimer, the term of this patent is extended or adjusted under 35 U.S.C. 154(b) by 0 days.

(21) Appl. No.: 16/209,275

(22) Filed: Dec. 4, 2018

(65) Prior Publication Data
US 2019/0353097 A1    Nov. 21, 2019

Related U.S. Application Data

(60) Provisional application No. 62/673,324, filed on May 18, 2018.

(51) Int. Cl.
| | | |
|---|---|---|
| *F02B 77/10* | (2006.01) | |
| *F16B 5/06* | (2006.01) | |
| *F02B 39/16* | (2006.01) | |

(52) U.S. Cl.
CPC .............. *F02B 77/10* (2013.01); *F02B 39/16* (2013.01); *F16B 5/0621* (2013.01)

(58) Field of Classification Search
CPC .. F02B 77/10; F02B 39/16; F41H 5/00; F41H 5/013; F42D 5/045; F02F 7/0031;
(Continued)

(56) References Cited

U.S. PATENT DOCUMENTS

| | | |
|---|---|---|
| 3,762,655 A | 10/1973 | Brewer |
| 3,795,231 A | 3/1974 | Brille |

(Continued)

FOREIGN PATENT DOCUMENTS

| | | | | |
|---|---|---|---|---|
| EP | 3222859 A1 | * | 9/2017 | ............... F16B 19/02 |
| WO | WO-0202914 A1 | * | 1/2002 | ......... B01D 46/0023 |

OTHER PUBLICATIONS

Lug Analysis.—Air Force Flight Dynamics Laboratory by JE Williams, 1979 (Year: 1979).*

(Continued)

*Primary Examiner* — Jacob M Amick
*Assistant Examiner* — Michael A Kessler
(74) *Attorney, Agent, or Firm* — Dunlap Bennett & Ludwig PLLC

(57) ABSTRACT

A method and system for restraining the top plate of ballistic cover systems used during a supercharged engine explosion is provided. The restraining system embodies bushing-pin attachment points along the periphery of the top plate for attaching the restraint straps. The attachment points may be set at an angle of incidence relative to the top plate. Each bushing-pin attachment point includes spaced apart bushings for retaining a retention pin. The retention pin is made of a material more malleable than that of the top plate and the bushings so as to absorb a predominance of the stress through the restraint straps during an explosion. Moreover, the retention pins are easily detachable from the bushings for installation and repair purposes.

7 Claims, 4 Drawing Sheets

(58) Field of Classification Search
CPC ........ F02F 7/0065; F02F 7/0068; F02F 7/008; B60D 1/025; F16G 15/06; F16G 15/08; F16B 21/02; F16B 2021/14; Y10T 403/32221
USPC .......... 123/195 C, 198 D, 198 E; 403/78, 79, 403/165
See application file for complete search history.

(56) References Cited

U.S. PATENT DOCUMENTS

| | | | |
|---|---|---|---|
| RE29,798 E | 10/1978 | Johnson | |
| 4,417,538 A | 11/1983 | El-Ramey | |
| 4,606,111 A | 8/1986 | Okazaki et al. | |
| 4,639,951 A | 2/1987 | Lamot | |
| 4,955,352 A | 9/1990 | Takeda | |
| 5,139,159 A | 8/1992 | Daugherty, Jr. et al. | |
| 5,209,935 A | 5/1993 | Jacino et al. | |
| 5,277,632 A | 1/1994 | Davis | |
| 5,614,280 A * | 3/1997 | Hanna | B60R 21/00 123/198 E |
| 5,970,959 A | 10/1999 | Stroud | |
| 6,032,884 A | 3/2000 | Bowling et al. | |
| 6,328,013 B1 * | 12/2001 | Calhoun | B62J 27/00 123/198 D |
| 6,328,023 B1 | 12/2001 | Sage | |
| 7,137,384 B1 | 11/2006 | Kavadeles | |
| 7,784,665 B2 | 8/2010 | Kilibarda et al. | |
| 9,677,470 B2 * | 6/2017 | Brown | F02B 77/10 |
| 2007/0062498 A1 | 3/2007 | Woods | |
| 2008/0060623 A1 | 3/2008 | Prior | |
| 2015/0184586 A1 | 7/2015 | Tanaka et al. | |
| 2015/0300784 A1 * | 10/2015 | Scarinci | F41H 5/013 89/36.02 |
| 2017/0022896 A1 | 1/2017 | Brown et al. | |
| 2017/0087946 A1 | 3/2017 | Fincher | |
| 2017/0101917 A1 | 4/2017 | Miretti | |
| 2017/0152818 A1 * | 6/2017 | Newman | F02M 35/104 |
| 2018/0291804 A1 * | 10/2018 | Nola | B60R 13/0838 |
| 2019/0376449 A1 * | 12/2019 | Carrell | F02B 77/10 |

OTHER PUBLICATIONS https://www.kickstarter.com/projects/alliedtitanium/high-strength-titanium-locking-d-shackle (Year: 2013).*
https://www.alliedtitanium.com/products/fasteners/clevispins (Year: 2016).*

* cited by examiner

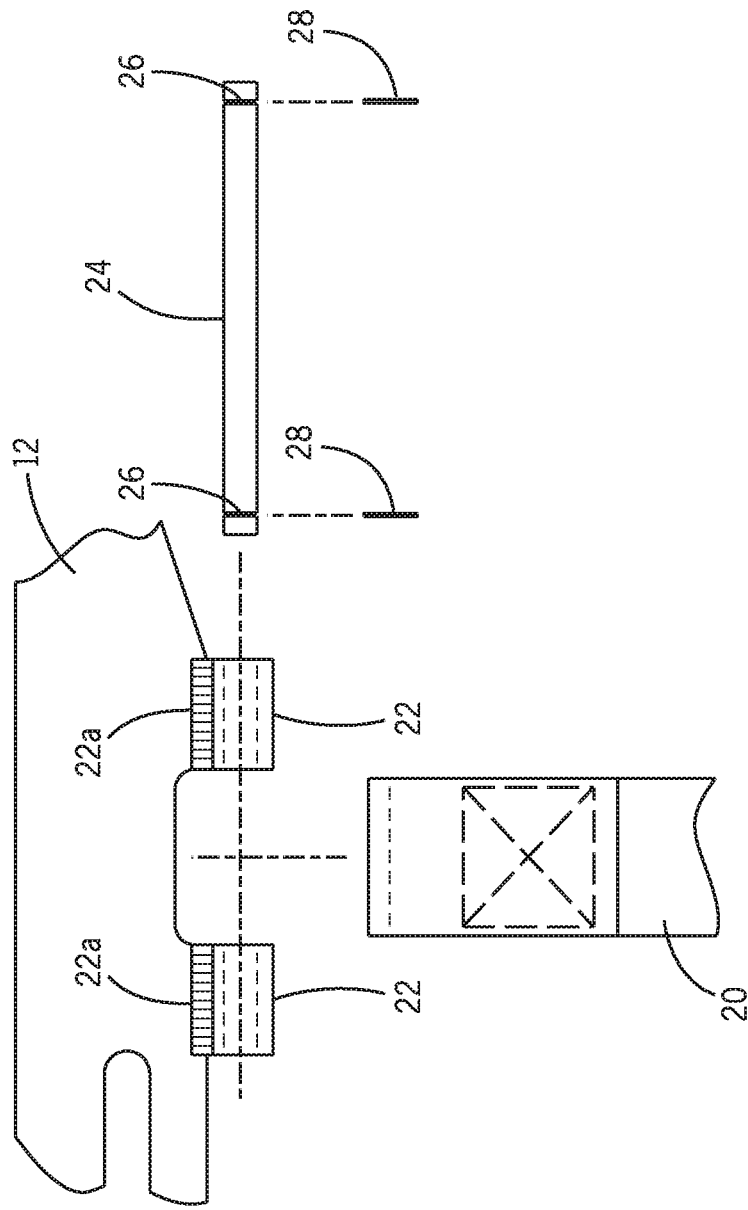

MODULAR SUPERCHARGER TOP PLATE SYSTEM

CROSS-REFERENCE TO RELATED APPLICATION

This application claims the benefit of priority of U.S. provisional application No. 62/673,324 filed 18 May 2018, the contents of which are herein incorporated by reference.

BACKGROUND OF THE INVENTION

The present invention relates to explosive containment systems and, more particularly, to a method and system for restraining the top plate of ballistic cover systems used during a supercharged engine explosion.

Supercharged engines, such as the Roots type supercharger, frequently explode during competition, in part because of the use of nitro-methane fuel. When supercharged race engines explode the resulting energy and projected fragmentation poses a sever risk of personal injury and mechanical damage. The problem has been solved by the attachment of a restraint system that prevents the supercharger for detaching completely from the engine.

This current method has several issues or disadvantages that cause related problems and expenses to occur. Specifically, the current containment covers used to control such explosions have top plates that provide a plurality of plate strap slots along but inward from its rear and side periphery, each plate strap slot dimensioned and adapted to operatively associate with a loop of a restraint strap used to contain the exploding engine. Through these loops, the restraint straps sewn closed into the top plate, requiring expensive and time-consuming repairs after an explosion as the top plate and sewn-closed loops need to be shipped back to the manufacturer for in-house repairs and replacement.

Furthermore, the discontinuity of the slots just inward of the periphery of the top plate introduces weakness therein. This, coupled with the angle of restraint (i.e., the angle of incidence between the top plate and attachment points) current slot-loop attachment points demand, needlessly damage and deform the top plate, which makes removal and replacement more time intensive, while lessening the likelihood of reusing the very expensive titanium top plates.

As can be seen, there is a need for a ballistic cover system embodying a new method of restraint for the top plate. The top plate of the present invention provides bushing-pin attachment points to operative associate with the loops of the restraint straps. The bushing-pin attachment points absorb the impact through deformation so the top plate absorbs less stress than current systems, thus making replacement of the top plate and the restraint straps components more convenient. Moreover, the absence of slot openings makes the top plate itself more continuous, and thus capable of better distribution of stress during explosions; minimizing damage thereto relative to the current ballistic cover systems. Finally, since the pins are adapted to slide out of the bushings, such attachment points are quickly detachable, making the installation and reuse of the top plate much less labor intensive, with no special tools: especially important for a race team making on-site repairs for many such engines within the crucible that is the competitive supercharger racing industry.

SUMMARY OF THE INVENTION

In one aspect of the present invention, a system for retaining a top plate of a ballistic cover system for competitive supercharged engines includes a top plate providing a plurality of attachment points joined along a periphery thereof; and each attachment point includes two spaced apart sleeve bushings; and a retention pin dimensioned to be simultaneously received through the two spaced apart sleeve bushings, wherein each retention pin is outward of said periphery.

In another aspect of the present invention, the system for retaining a top plate of a ballistic cover system for competitive supercharged engines includes a top plate providing a plurality of attachment points joined along a periphery thereof; and each attachment point comprises: two spaced apart sleeve bushings; a retention pin dimensioned to be simultaneously received through the two spaced apart sleeve bushings, wherein each retention pin is outward of said periphery, wherein each retention pin has a yield strength less than the yield strength of the two spaced apart sleeve bushings and the top plate; a retention connector detachable couplable to each opposing end portion of each retention pin, the retention connector movable between a disengaged condition and an engaged condition preventing said end portion from sliding through the respective sleeve bushing of the two spaced apart sleeve bushings; and a retention groove at each opposing end portion for associating the retention connector in the engaged condition, wherein each retention pin is made of grade 2 titanium, and wherein each sleeve bushing and the top plate is made of grade 5 titanium.

These and other features, aspects and advantages of the present invention will become better understood with reference to the following drawings, description and claims.

BRIEF DESCRIPTION OF THE DRAWINGS

FIG. 6 is a detailed exploded plan view of an attachment point of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method and system for restraining the top plate of ballistic cover systems used during a supercharged engine explosion. The restraining system embodies bushing-pin attachment points along the periphery of the top plate for attaching the restraint straps, wherein the attachment points are set an angle of incidence relative to the top plate for superior performance. Each bushing-pin attachment point includes spaced apart bushings for retaining a retention pin. The retention pin is made of a material more malleable than that of the top plate and the bushings so as to absorb a predominance of the stress through the restraint straps during an explosion. Moreover, the retention pins are easily detachable from the bushings for installation and repair purposes.

Referring to FIGS. 1 through 6, the present invention may include a mounting system 10 for restraining the top plate of ballistic cover systems used during a supercharged engine explosion.

Figure 1:
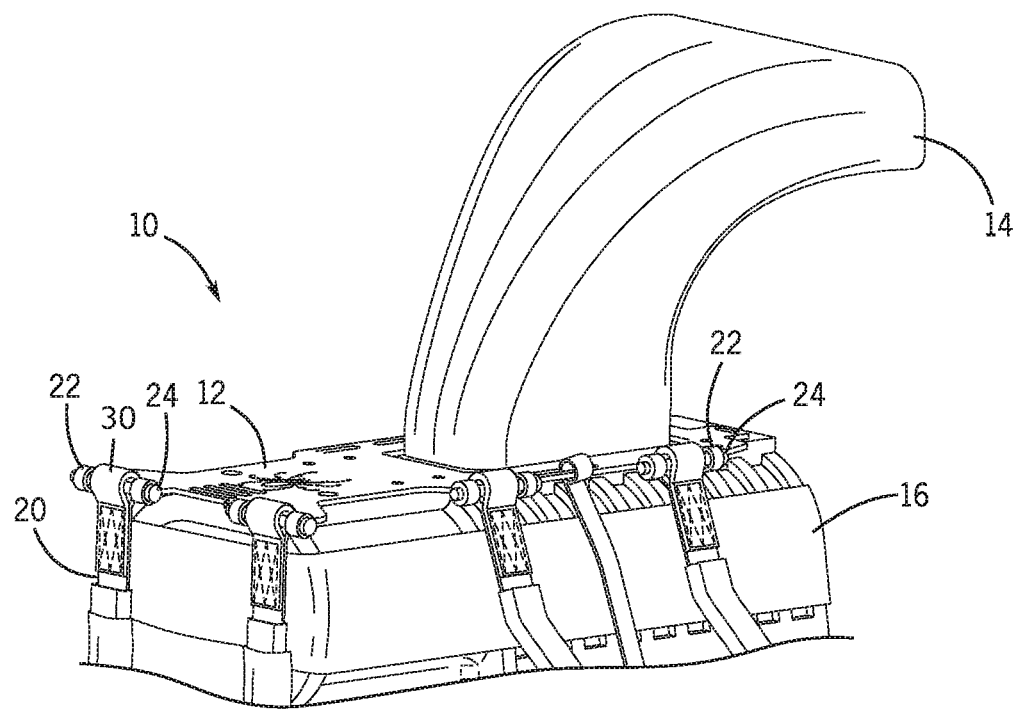
FIG. 1 is a perspective view of an exemplary embodiment of the present invention, shown in use.

Referring to FIG. 1, the ballistic cover systems include, among other things, a top plate 12 and a plurality of restraint straps 20 operatively attach along the periphery thereof. The top plate 12 is dimensioned and adapted to be mounted to an upper portion of a predetermined competitive supercharged engine; for example, by including a scoop opening to accommodate the injector hat ("scoop") 14 extending out of the supercharger case 16. The top plate 12 may be made of ballistic material with suitable energy absorption capability, such as but not limited to grade titanium.

Figure 2:
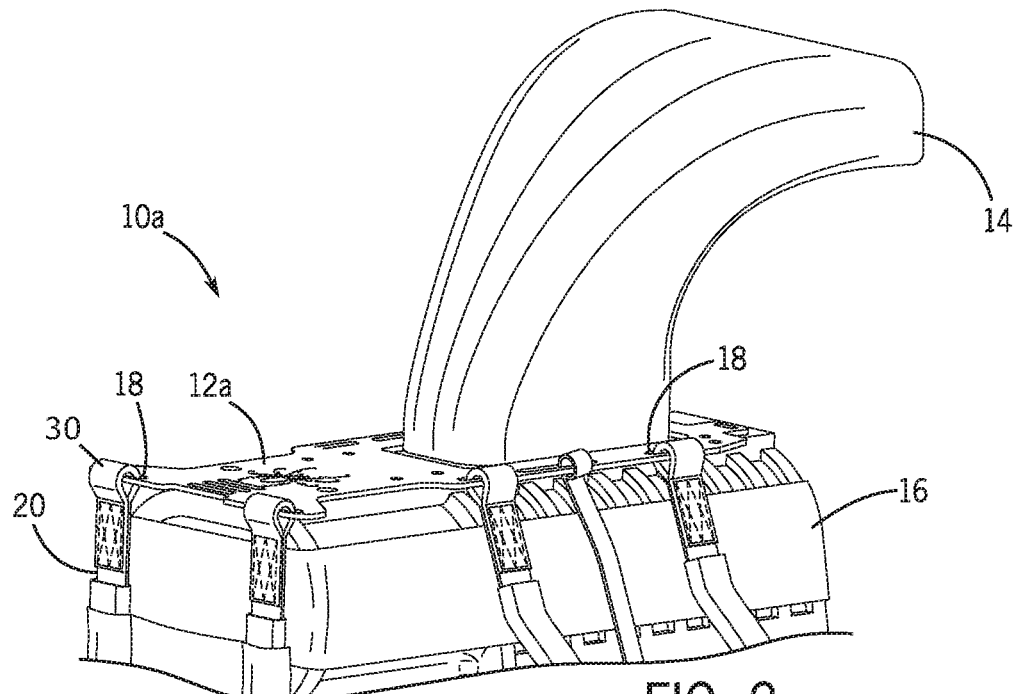
FIG. 2 is a perspective view of an exemplary embodiment of the prior art.
Figure 3:
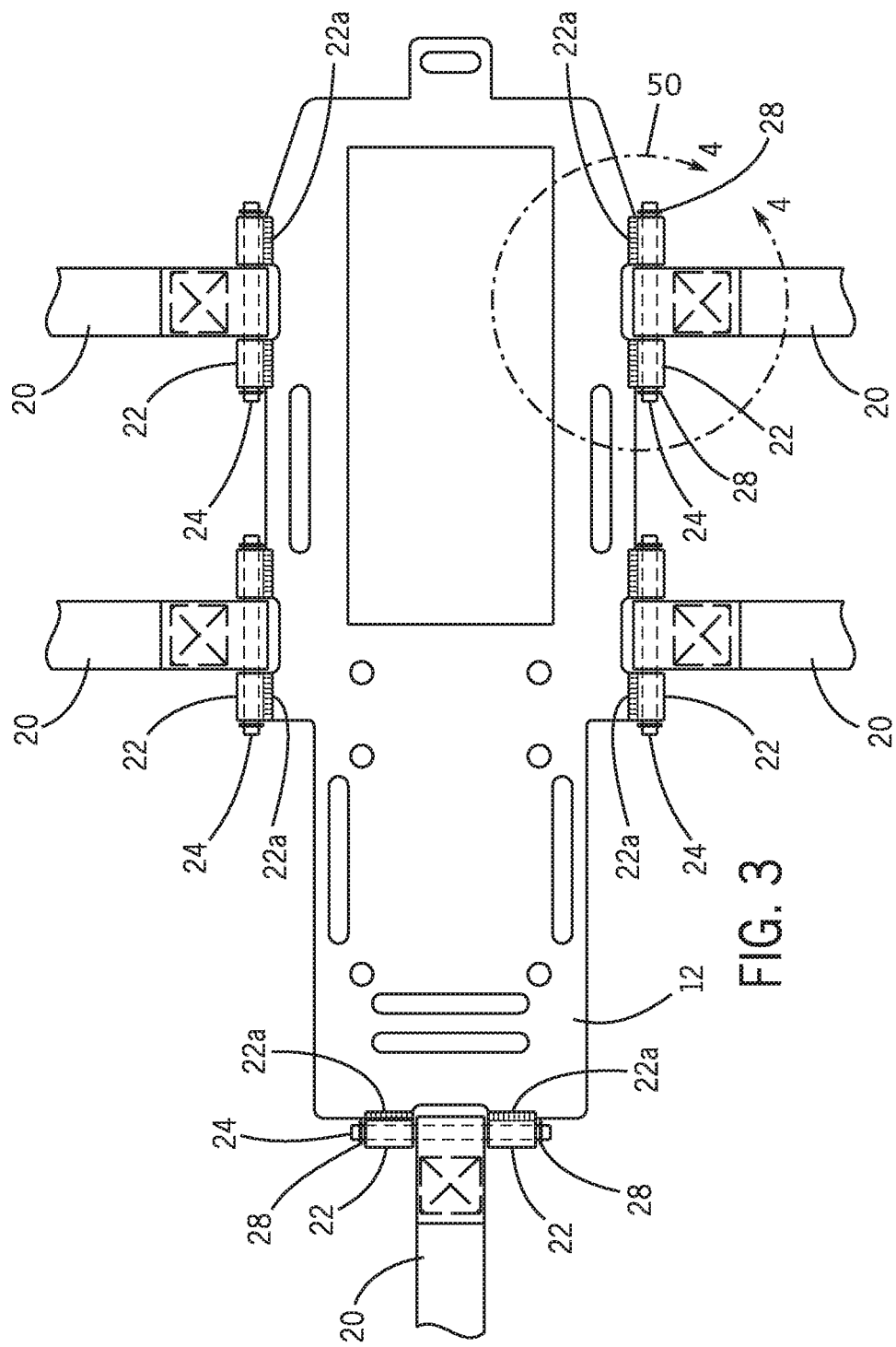
FIG. 3 is a top plan view of an exemplary embodiment of the present invention.
Figure 4:
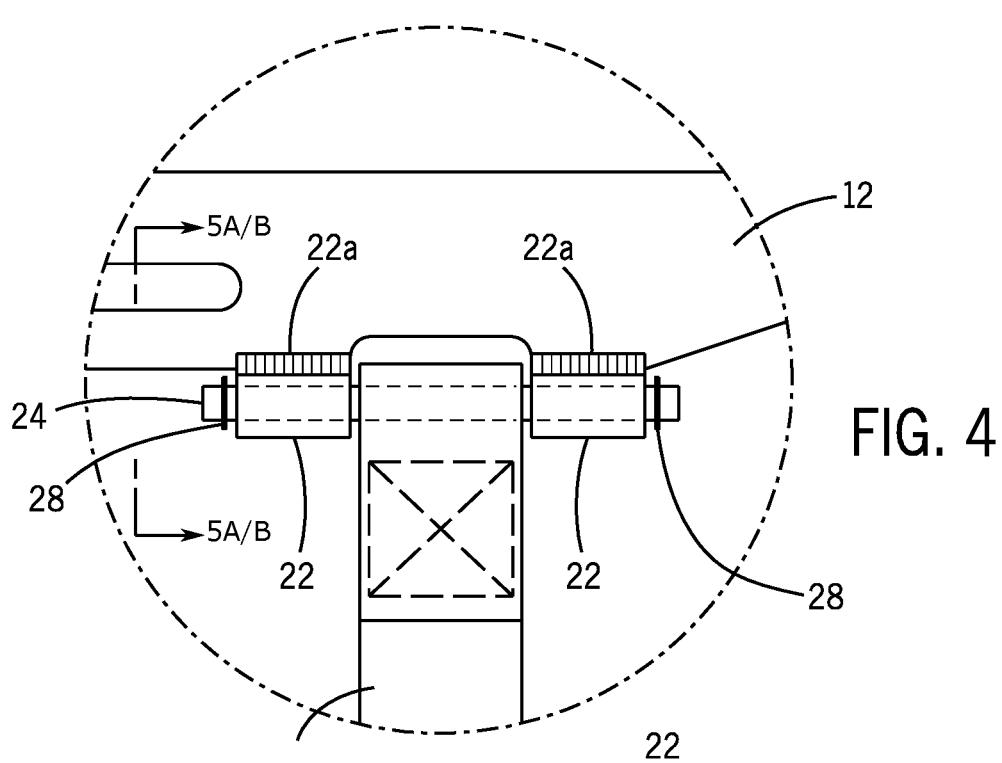
FIG. 4 is an enlarged detail view of an exemplary embodiment of the present invention, taken along line 4-4 in FIG. 3.

Referring to FIG. 2, in the prior art, ballistic cover systems 10a have a top plate 12a providing a plurality of plate strap slots 18 along but inward from its rear and side periphery, respectively, wherein each plate strap slot 18 slidably receives a restraint strap 20 or a loop 30 thereof. The disadvantages of such attachment points are addressed above.

Figure 5A:
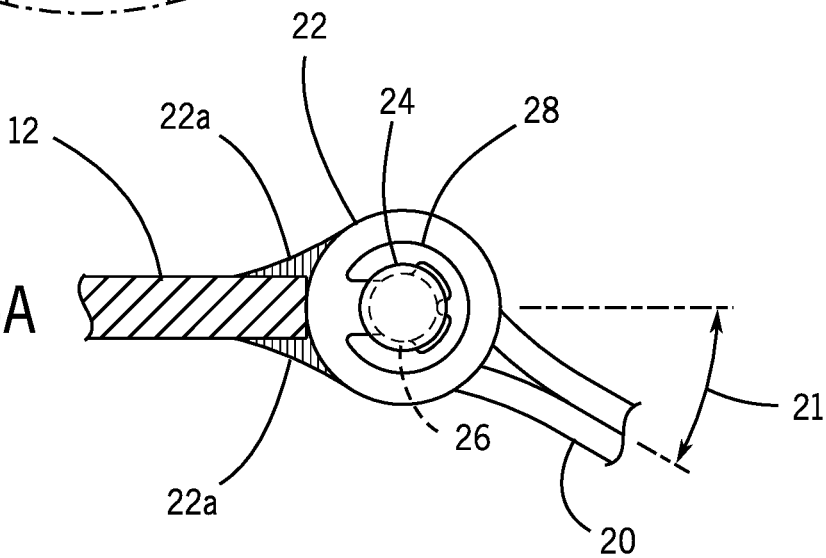
FIG. 5A is a cross-sectional view of an exemplary embodiment of an attachment point of the present invention, taken along line 5A/B-5A/B in FIG. 4.
Figure 5B:
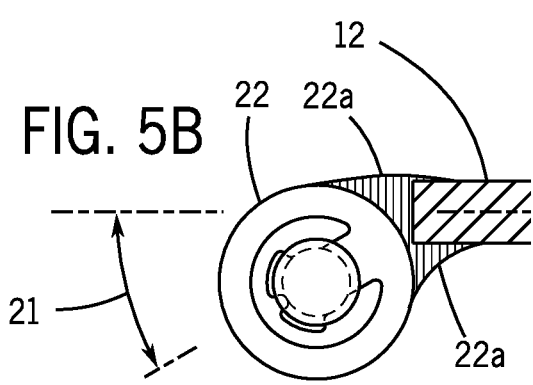
FIG. 5B is a cross-sectional view of an exemplary embodiment of an attachment point of the present invention, also taken along line 5A/B-5A/B in FIG. 4.

Referring to FIGS. 3 through 5B, the present invention provides novel attachment points 50 along the periphery of the top plate 12 of a ballistic cover system 10 (as opposed to the strap slots of the prior art). Each attachment point 50 provides two spaced apart mounting bushings 22 that may be joined to the periphery of the top plate 12 through bushing welds 22a. Each mounting bushing 22 may be solid sleeve bushings dimensioned and adapted to slidably receive a retention pin 24. The mounting bushings 22 are mounted on the top plate 12 so as to be set at an angle of incidence 21 downward relative to the plane defined by the top plate 12, as illustrated in FIG. 5B. Thereby the mounting bushings 22 and so the connecting loops of the restraint straps 20 are in a more direct alignment with the lower retention header brackets points (not shown). The angle of incidence 21 may range between 15 and 45-degrees relative to said top plate plane. The retention pins 24 and mounting bushings 22 may be made of ballistic material with suitable energy absorption capability, such as but not limited to titanium.

Each retention pin 24 extends between two opposing ends. Just inward of each end is a retention groove 26 for removably engaging a retention connector 28 adapted to prevent the retention pin 24 from sliding through the mounting bushings 22. In certain embodiments, the retention connector 28 may be a snap ring or clip and the retention groove 26 a snap ring groove.

Importantly, the titanium of the retention pin 24 is a lower grade than the mounting bushings 22 and joined the top plate 12, whereby the retention pins 24 are more flexible that the joined top plate 12. As a result, the retention pin 24 absorbs most of the stress (from the restraint straps 20) without passing it to the top plate 12, via the bushings 24. This allows the user to replace the retention pin(s) 24 when damaged and keep the top plate 12 in service. This method also allows the users to replace any damaged restraint straps 20 on site without the added expense of shipping them back to the manufacturer. The restraint straps 20 are designed to absorb a minimum of 24,800 pounds of pull stress and at the same time are designed to allow 20% stretch when under pressure. This allows he supercharger to lift off the intake manifold of the engine and release as much pressure as possible. The restraint straps 20 are there to allow the supercharger to fall back onto the engine as opposed to landing on the race track or driver. The restraint straps 20 are also designed to be fire resistant and be preselected lengths to keep the supercharger from striking the carbon fiber race bodies that cost over $60,000 to replace.

One of the most critical advantages of the novel attachment points is that they are interchangeable at the track by each team. As many teams have several race cars under roof, and so such users can reduce the cost of purchases and repairs with the present invention by reducing the amount of replacement parts, as these interchangeable parts can be shared among the cars. For example, when a restraint strap 20 is torn, burned, damaged or otherwise unusable for any reason, the teams can keep the ballistic cover system 10 in service by replacing the damaged restraint strap 20 on site.

In certain embodiments, the top plate 12 is made from Grade 5 Titanium that is approximately 125,000 (one hundred and twenty-five thousandths) of an inch (or ⅛th inch) thick. It has several openings that are cut there through (typically via a water jet machine) and contoured and smoothed (typically by a CNC machine). Each top plate 12 may be shaped according to the design that is supplied by the supercharger manufacturer.

Then the mounting bushing 22 may be machined from Grade 5 titanium and welded onto the top plate 12 at the attachment points 50 where the restraint straps 20 are to be attached. The mounting bushing 22 may be set on a specific angle on incidence 21 of approximately 30-degrees downward (relative to the top plate 12) to ensure alignment with the lower retention brackets (header brackets, not shown) There are two spaced apart bushings 22 attached to each attachment point 50. Then the retention pin 24 is machine from a lesser grade titanium, like grade 2 titanium round stock (approximately 375,000 of an inch in diameter) making it more flexible that the mounting bushings 22 and the top plate 12. Each end of each retention pin 24 is machine with the required application to accept the retention connector/clip 28 requested by the team. The actual retention straps 20 may be made from 4088 military grade webbing (as specified) and each strap is cut to the correct size for the predetermined application. Next each end may be wrapped in a fire-resistant material to protect during explosions. The strap may then be attached to a specific "JIG" to determine it correct sewing position. The ends are then folded over themselves approximately 10" on each end and placed into an automatic tacking sewing machine to form the loops 30. Each end gets the prescribed sewing pattern applied with industrial threads to ensure it will withstand the stress specifications. Once removed the entire strap is now wrapped in a full layer of fire-resistant material to protect the webbing and threads from fire. The product may be tagged as SFI-approved by attaching manufacturer's label and brand name as required. The restraint straps 20 can now be attached simply by removing the round retention pins 24 and sliding the restraints between the mounting bushings 22 and re-attaching the pins 24 through the restraint strap end loop 30.

Also, the present invention can be embodied in any device that requires ballistic restraints.

It should be understood, of course, that the foregoing relates to exemplary embodiments of the invention and that modifications may be made without departing from the spirit and scope of the invention as set forth in the following claims.

What is claimed is:

1. A system for retaining a top plate of a ballistic cover system for competitive supercharged engines, comprising:
    a plurality of attachment points joined along a periphery of the top plate; and
    each attachment point comprises:
        two spaced apart sleeve bushings;
        a weld material built-up connecting each sleeve bushing to the top plate at an angle of incidence downward relative to a plane defined by the top plate, wherein the angle of incidence is between 15-degrees and 45-degrees; and
        a retention pin dimensioned to be simultaneously received through the two spaced apart sleeve bushings, wherein each retention pin is outward of said periphery.

2. The system of claim 1, further comprising a retention connector detachable couplable to each opposing end portion of each retention pin, the retention connector movable between a disengaged condition and an engaged condition preventing said end portion from sliding through the respective sleeve bushing of the two spaced apart sleeve bushings.

3. The system of claim 2, further comprising a retention groove at each opposing end portion for associating the retention connector in the engaged condition.

4. The system of claim 1, wherein each retention pin has a yield strength less than the yield strength of the two spaced apart sleeve bushings and the top plate.

5. The system of claim 4, wherein each retention pin is made of grade 2 titanium, and wherein each sleeve bushing and the top plate is made of grade 5 titanium.

6. A system for retaining a top plate of a ballistic cover system for competitive supercharged engines, comprising: a plurality of attachment points joined along a periphery of the top plate; and each attachment point comprises: two spaced apart sleeve bushings; a weld material built-up connecting each sleeve bushing to the top plate at an angle of incidence downward relative to a plane defined by the top plate, wherein the angle of incidence is between 15-degrees and 45-degrees; a retention pin dimensioned to be simultaneously received through the two spaced apart sleeve bushings, wherein each retention pin is outward of said periphery, wherein each retention pin has a yield strength less than the yield strength of the two spaced apart sleeve bushings and the top plate; a retention connector detachable couplable to each opposing end portion of each retention pin, the retention connector movable between a disengaged condition and an engaged condition preventing said end portion from sliding through the respective sleeve bushing of the two spaced apart sleeve bushings; and a retention groove at each opposing end portion for associating the retention connector in the engaged condition.

7. The system of claim 6, wherein each retention pin is made of grade 2 titanium, and wherein each sleeve bushing and the top plate is made of grade 5 titanium.

* * * * *